United States Patent [19]

Swanson

[11] Patent Number: 4,619,061
[45] Date of Patent: Oct. 28, 1986

[54] SNOWBLOWER

[76] Inventor: John L. Swanson, 1302 Louise Ave., Saskatoon, Saskatchewan, Canada, S7H 2P9

[21] Appl. No.: 757,174

[22] Filed: Jul. 22, 1985

Related U.S. Application Data

[63] Continuation-in-part of Ser. No. 551,356, Nov. 14, 1983, abandoned.

[30] Foreign Application Priority Data

Dec. 24, 1982 [CA] Canada .................................. 418629

[51] Int. Cl.⁴ .............................................. E01H 5/09
[52] U.S. Cl. .................................................. 37/248
[58] Field of Search .......... 37/232, 233, 242, 244–245, 37/248, 249, 254–255, 258; 403/2

[56] References Cited

U.S. PATENT DOCUMENTS

| | | | |
|---|---|---|---|
| 1,691,232 | 11/1928 | Edwards | 37/245 |
| 1,807,489 | 5/1931 | Middleton et al. | 37/258 |
| 2,482,213 | 9/1949 | Ritchie | 37/249 |
| 2,585,113 | 2/1952 | Gredell | 403/2 X |
| 2,587,415 | 2/1952 | Nanvick | 37/257 |
| 2,751,831 | 6/1956 | Null | 37/244 |
| 2,870,850 | 1/1959 | Dethlefsen | 37/258 |
| 3,041,749 | 7/1962 | Lamy | 37/258 |
| 3,115,714 | 12/1963 | Johann | 37/258 |
| 3,128,729 | 4/1964 | Henson | 37/242 |
| 3,140,768 | 7/1964 | Marr | 37/249 X |
| 3,315,381 | 4/1967 | Fisher | 37/233 X |
| 3,429,061 | 2/1969 | Haban | 37/258 |
| 3,576,097 | 4/1971 | Speiser | 37/232 |
| 3,602,065 | 8/1971 | Ratcliff | 403/2 |
| 3,755,931 | 9/1973 | Gisler | 37/252 |
| 3,774,321 | 11/1973 | David | 37/257 X |

FOREIGN PATENT DOCUMENTS

| | | | |
|---|---|---|---|
| 578032 | 6/1959 | Canada | 37/257 |
| 627517 | 9/1961 | Canada | 37/248 |
| 771243 | 10/1980 | U.S.S.R. | 37/232 |

Primary Examiner—E. H. Eickholt
Attorney, Agent, or Firm—Stanley G. Ade; Adrian D. Battison

[57] ABSTRACT

A snowblower includes an auger having individual flat spring steel blades mounted on plates carried by a shaft. The blades are connected to the plates by a pivot pin and a shear pin so that on encountering a solid object the shear pin allows the blade to pivot while remaining attached to the shaft.

1 Claim, 2 Drawing Figures

SNOWBLOWER

This application is a continuation-in-part of U.S. patent application Ser. No. 551,356 filed Nov. 14, 1983 and now abandoned.

BACKGROUND OF THE INVENTION

This invention relates to snowblowers and particularly to a construction of auger therefore. Snowblowers have been known for many years comprising a rotatable auger and means for moving the auger towards the snow so that as it rotates it moves the snow axially towards the opening of a suction fan which acts to collect the snow from the auger and blow it out to a remote location. One example of such an apparatus is disclosed in Canadian Pat. No.: 578,032 in which the auger has blades which are angled relative to the shaft in one direction adjacent the other end of the auger and in another direction adjacent the other end so that the snow is moved by rotation of the auger towards the middle of the shaft at which point it is collected by the fan and blown out to the remote location. Such a snowblower can be mounted on wheels for being pushed by hand or it can be arranged for connection to a vehicle such as a tractor as shown in the above patent.

One serious problem which arises in relation to apparatus of this type is that the blades can come into contact with solid objects in the path to be cleared of snow that is either any unevenesses in the ground to be cleared or any separate objects buried within the snow and invisible to the operator. Such solid objects can cause serious damage in that if they are sufficiently unyielding they will bend or break the blades of the auger thus putting it out of action or reducing its efficiency. Furthermore if the object is broken up by the blade the pieces can cause further damage by being sucked into the fan and even by being ejected from the fan.

SUMMARY OF THE INVENTION

It is one object therefore of this invention to provide a snowblower of the above type having an auger which is resistant to damage from contact with a solid object within the snow.

Accordingly the invention provides in a snowblower, an auger comprising a shaft, bearing means for mounting the shaft for rotation about its axis, means for rotatably driving the shaft, a plurality of blades, and a plurality of mounting means each mounting a respective one of said blades on said shaft for rotation therewith so that rotation of the shaft causes snow engaged by the blades to be moved axially of the shaft for collection, said mounting means comprising pivotal mounting means for mounting said blade on said shaft so as to be pivotable about an axis parallel to the axis of the shaft and shear means arranged to normally prevent such pivotal movement and to shear to allow such pivotal movement on impact of said blade with a solid object.

It is therefore one advantage of the present invention that the blades are resistant to damage in that they yield on contact with any solid object but do not come free from the shaft but hence are not lost in the snow or drawn into the apparatus thus causing damage. Any blade thus impacted with a solid object will not be seriously bent or damaged and will remain attached to the shaft for rotation therewith. In this way the efficiency of the auger is not unduly impaired and can be replaced into full working order very readily merely by replacement of a shear pin at very little expense.

Is a further advantage of the present invention that blades can be manufactured in flat form from spring steel and thus are inexpensive to manufacture and resistant to damage from any impact with a solid object.

It is a yet further advantage of the present invention that the shaft is mounted for vertical adjustment so as to adjust the position of the blades relative to the ground thus enabling the auger to pass over differing grounds without incurring damage from any unevenness.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

The snowblower comprises an outer casing or framework 10 mounted on a vehicle or on independent wheels (not shown) so as to be movable across the surface to be cleared of snow. The auger is driven by a chain and chain wheel 11 so that it rotates in the direction determined by the blade angles such that the snow is driven by the blades towards the center of the snowblower where it is drawn through an opening 12 by a fan schematically indicated at 13 which acts to draw the collected snow into a duct 14 for ejection to a remote location by trunking.

Figure 1:
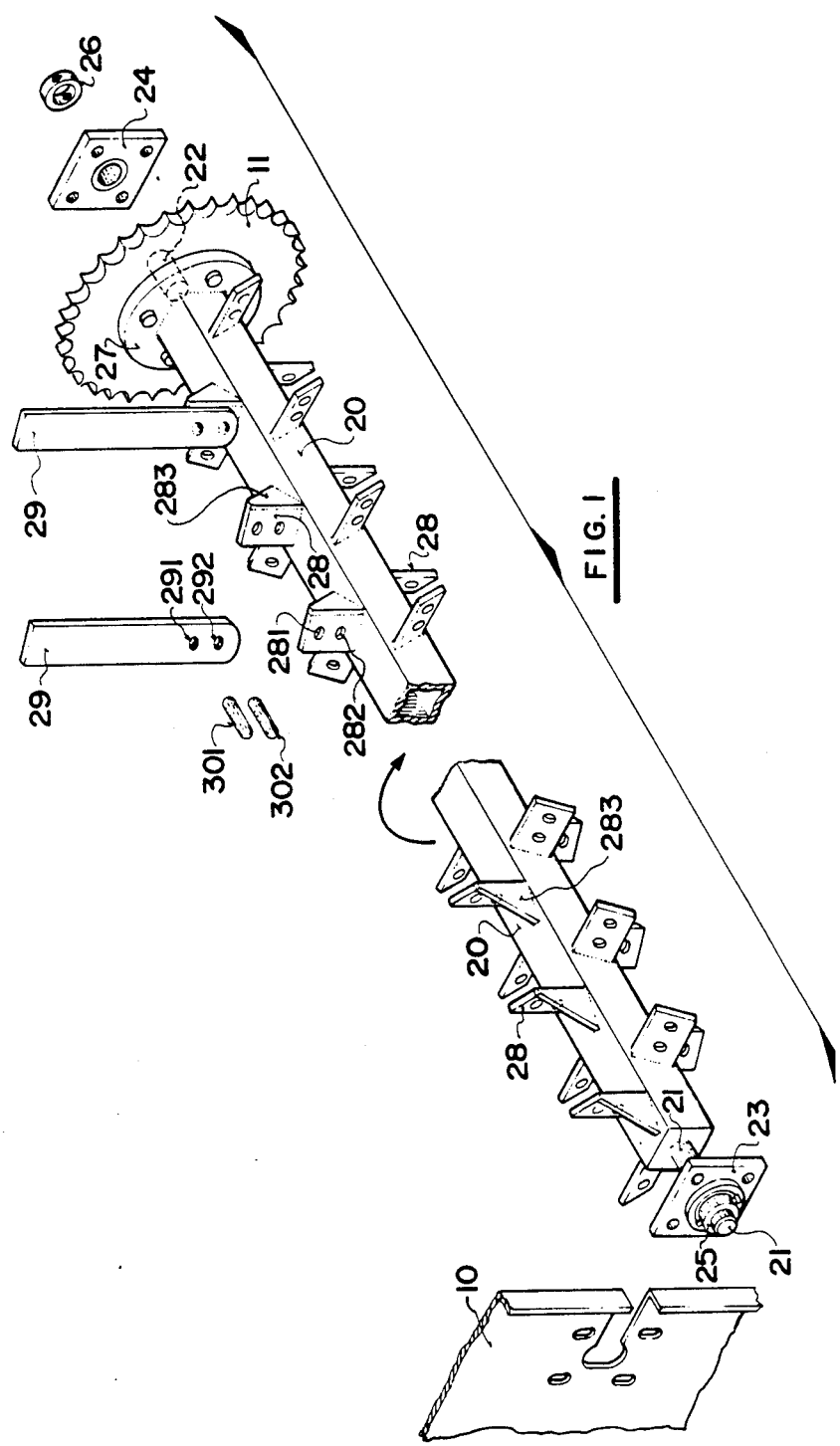
FIG. 1 is an exploded isometric view of an auger for use with a snowblower.
Figure 2:
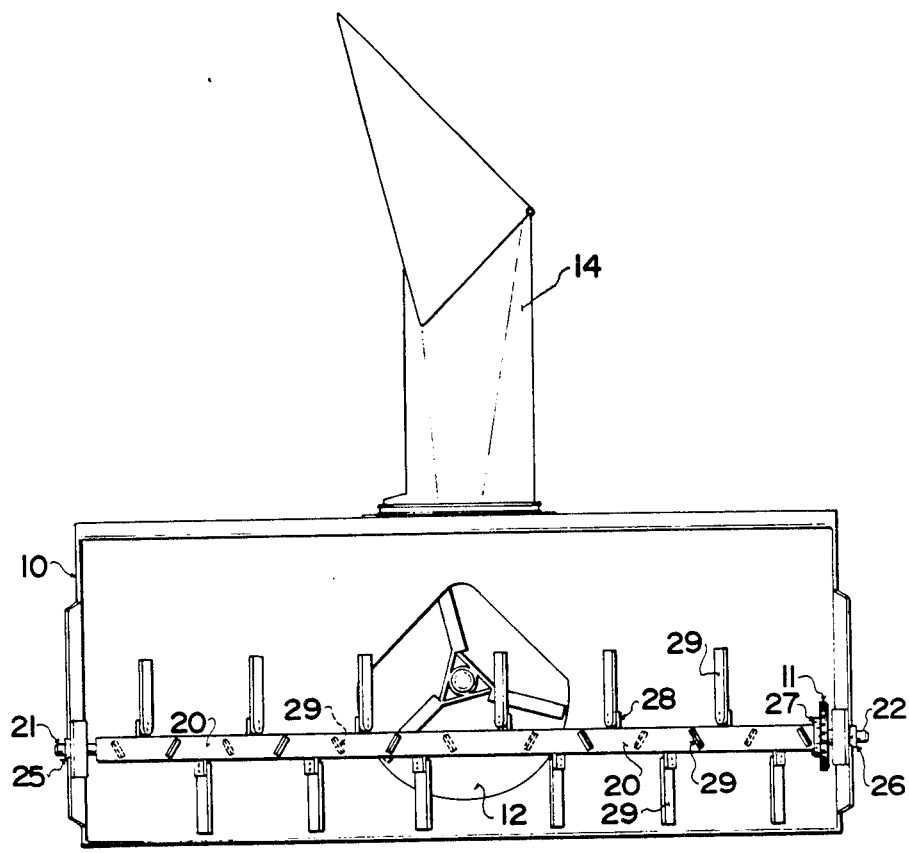
FIG. 2 is a front elevation of the auger of FIG. 1.

Turning to the specific detail of FIG. 1, the auger comprises a shaft 20 of square section tubing carrying at each end a circular section rod 21, 22 for cooperation with respective bearings 23, 24. Each of the bearings 23, 24 comprises a conventional ball bearing set mounted within a plate provided with openings for mounting on the sides of a snowblower as shown in FIG. 2. A portion of each of the sides of the blower is shown in FIG. 1 and the side on the right are shown on the drawing includes five openings, the central one of which is dimensioned to receive the shaft portion 22 and the four outer openings are arranged to receive bolts passing through the openings of the bearing plate 24 so as to clamp the bearing plate to the side of the snowblower. Similarly the lefthand side of the snowblower provides four openings and a central opening for receiving the respective bearing plate 23. However for receiving the end portion 21 of the shaft into the side of the snowblower a slot is cut from the front edge to the position where the bearing plate is to be located. In addition all five openings on both sides are elongate in the vertical direction to provide a vertical adjustment of the position on the shaft relative to the ground. Respective end collars 25, 26 are provided on the shaft portions 21 and 22 respectively so as to clamp the shaft axially against the bearings 23 and 24.

The chain wheel 11 is secured to the shaft 20 by passing over the shaft portion 22 prior to assembly and by clamping to a plate 27 secured to the end of the tubular portion of the shaft for example by welding. For this purpose the chain wheel 11 has four openings for receiving respective bolts passing through the plate 27.

The tubular portion of the shaft 20 carries at equally spaced positions along its length a plurality of plates or flanges 28. The plates 28 are welded to the outer surface of the tube 20 at positions around its periphery so as to lie on a helix around the tube 20. In addition the plates 28 are welded at an angle to the radial plane at each location of roughly 45 so that rotation of the shaft causes axial movement of air and snow adjacent the plate concerned. It will be noted that the plates 28 adjacent the lefthand end of the shaft as viewed extend downwardly and leftwardly as viewed from the front and the plates 28 adjacent the righthand end extend downwardly and rightwardly as viewed from the front so that as the shaft rotates in clockwise direction as viewed from the lefthand end the plates 28 tend to move material towards the middle of the shaft 20. The use of tubing of the square cross section enables the plates readily to be affixed, for example by welding, to the periphery at 90 angular spacing around the axis of the shaft and arranged in the helix as mentioned previously.

Each plate 28 has two openings spaced radially of the shaft and passing through the plate substantially axially and includes a triangular web 283 arranged axially of the shaft to provide lateral support against forces tending to break the plate from the shaft. For convenience of illustration only three of the webs are shown in FIG. 1. Each plate 28 carries a respective one of a plurality of blades 29 each of which comprises a flat high grade steel or spring steel member generally of rectangular shape with two openings 291, 292 adjacent one end. These openings are arranged to cocoperate with the openings 281, 282 when the blade is placed adjacent a respective plate 28. Each blade is chamfered at its end adjacent the openings 291, 292 so that it can pivot about a pin passing through the cooperating openings 282, 292 without the edge of the blade contacting the shaft 20.

Each blade is mounted on its respective plate 28 by a pair of pins 301, 302 which pass through the cooperating openings 281, 291 and 282, 292 respectively. The pin 302 comprises a rigid pivot pin allowing the blade 29 to pivot relative to the plate 28 and providing sufficient strength to resist breakage except under extreme conditions. It may for example comprise a simple nut and bolt arrangment which will restrict the pivoting of the blade relative to the plate or it may comprise a loose fit pin which provides the pivotal movement and is merely prevented from slipping out of the cooperating openings 282, 292. In contrast, the pin 301 is of limited strength so that it is vulnerable to shear forces caused by impact of the respective blade 29 with any solid object thus inhibiting its movement around the axis of the shaft. Bolts which provide this shearing effect are available commercially.

Thus it will be appreciated that should the snowblower encounter a solid or relatively solid object constituted either by the ground or by any other object buried in the snow, those blades which encounter and impact upon a solid object will receive forces tending to pivot the respective blade about the pin 302. If the forces are sufficient to cause damage, the resistance of the pin 301 is chosen such that it shears prior to such damage being caused. Thus the blade is then free to pivot about the axis of the pin 302 sufficiently to escape further contact with the solid object and hence any damage. Furthermore except in extreme circumstances where major damage is caused, the blade remains attached to the plate by the pin 302 and hence remains attached to the shaft. In this way it continues to operate although possibly at reduced efficiency depending upon the angle it assumes.

In view of the resistance to impact, the blower can be used in areas where there is hard packed snow or ice or other hard materials such as frozen manure. In addition the blower can be used to collect other materials such as chaff, in which case the blower is connected to a collector for the material. In view of the resistance to impact, the blower can operate right down to ground level without fear of damage to the auger.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A snowblower comprising a casing for moving in a forward direction across ground to be clear of snow having an open front face for engaging the snow, an auger mounted in the casing for rotation about a substantially horizontal axis transverse to the forward direction, so as to move snow longitudinally of the auger towards an opening in the casing, and a fan mounted in the casing for withdrawing snow from the opening for discharge from the blower, the auger comprising a shaft which is square in cross section defining four sides, bearing means for mounting the shaft for rotation about said axis, means for rotatably driving the shaft, a plurality of blades, each blade comprising a planar rigid thin metal sheet which elongate, narrow and rectangular so as to define parallel side edges, an a plurality of mounting means each mounting a respective one of the blades on said shaft for rotation therewith so that rotation of the shaft causes snow engaged by the blades removed axially of the shaft for collection, each said mounting means comprising a rectangular flat plate having one edge attached to a respective side of the shaft and extending outwardly therefrom at right angles thereto and canted at an angle to the axis of the shaft, and a supporting web interconnecting a side edge of the plate to the side of the shaft, and including a first hole therethrough for receiving a pivot pin passing through said plate and through the respective blade for mounting said blade on said shaft so as to be parallel to the plate and pivotable about an axis at right angles to the plate and including a second hole therethrough for receiving a shear pin through said plate and through said blade arranged to normally prevent such pivotal movement, so as to maintain said blade with the side edges thereof at right angles to the respective side and to shear to allow such pivotal movement on impact of said blade with a solid object, each of the four sides of the shaft having thereon a plurality of said mounting means and respective blades arranged at one angle thereto to move snow in one direction therealong towards said opening and a plurality of said mounting means and respective blades arranged at another angle to move snow in an opposed direction therealong towards said opening.

* * * * *